US012808522B2

(12) United States Patent
Cabot et al.

(10) Patent No.: US 12,808,522 B2
(45) Date of Patent: Nov. 24, 2026

(54) HEADLAMP WITH DETACHABLE LIGHT ASSEMBLY

(71) Applicant: MILWAUKEE ELECTRIC TOOL CORPORATION, Brookfield, WI (US)

(72) Inventors: Benjamin Oliver Ryan Cabot, Milwaukee, WI (US); Alan Amundson, Milwaukee, WI (US); Patrick P. Stockwell, Milwaukee, WI (US); Christina Prestidge-Kadrlik, Hartland, WI (US); Michael J. Hopkins, Antioch, IL (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 251 days.

(21) Appl. No.: 18/477,014

(22) Filed: Sep. 28, 2023

(65) Prior Publication Data

US 2024/0027058 A1 Jan. 25, 2024

Related U.S. Application Data

(62) Division of application No. 17/543,242, filed on Dec. 6, 2021, now Pat. No. 11,815,249.

(Continued)

(51) Int. Cl.

*F21V 21/084* (2006.01)
*F21V 21/08* (2006.01)

(Continued)

(52) U.S. Cl.

CPC ........ *F21V 21/084* (2013.01); *F21V 21/0816* (2013.01); *F21V 21/0885* (2013.01); *F21V 21/096* (2013.01)

(58) Field of Classification Search

CPC ............... F21V 21/0816; F21V 21/084; F21V 21/0885; F21V 21/096; F21V 21/14; F21V 21/30

(Continued)

(56) References Cited

U.S. PATENT DOCUMENTS

| | | | | |
|---|---|---|---|---|
| 4,654,764 A * | 3/1987 | Hsiao | ........................ | F21L 2/00 362/199 |
| 6,457,838 B1 | 10/2002 | Dugmore et al. | | |

(Continued)

FOREIGN PATENT DOCUMENTS

| | | |
|---|---|---|
| CN | 209839744 U | 12/2019 |
| CN | 110822309 A | 2/2020 |

(Continued)

OTHER PUBLICATIONS

Partial Supplementary European Search Report for Application No. 21901608.6 dated Sep. 16, 2024 (16 pages).

(Continued)

*Primary Examiner* — Thomas M Sember
(74) *Attorney, Agent, or Firm* — Michael Best & Friedrich LLP

(57) ABSTRACT

A headlamp includes a strap, a bracket coupled to the strap, and a light assembly including a housing enclosing a light source and a battery for providing power to the light source. A magnetic interface is configured to removably couple the light assembly to the bracket. The magnetic interface includes a first magnetic element fixed to the bracket, and a second magnetic element fixed to the light assembly. The first magnetic element and the second magnetic element are configured to produce a magnetic attractive force to retain the light assembly relative to the bracket.

20 Claims, 6 Drawing Sheets

Related U.S. Application Data

(60) Provisional application No. 63/121,480, filed on Dec. 4, 2020.

(51) Int. Cl.
*F21V 21/088* (2006.01)
*F21V 21/096* (2006.01)

(58) Field of Classification Search
USPC .................................................. 362/287, 427
See application file for complete search history.

(56) References Cited

U.S. PATENT DOCUMENTS

| | | | | |
|---|---|---|---|---|
| 6,457,841 | B1 * | 10/2002 | Lynch ..................... | F21L 4/045 362/205 |
| 6,497,493 | B1 | 12/2002 | Theisen | |
| 6,575,587 | B2 | 6/2003 | Cramer et al. | |
| 8,157,401 | B2 | 4/2012 | Lau | |
| 8,201,961 | B2 | 6/2012 | Lau | |
| 8,517,559 | B1 | 8/2013 | Freschl | |
| 8,662,699 | B2 | 3/2014 | Tarter | |
| 8,851,717 | B2 | 10/2014 | Verbrugh | |
| 9,872,531 | B2 | 1/2018 | Uke et al. | |
| 2009/0009986 | A1 | 1/2009 | Wu | |
| 2018/0017241 | A1 | 1/2018 | Grider et al. | |
| 2018/0187869 | A1 | 7/2018 | Wiegel et al. | |
| 2018/0231234 | A1 | 8/2018 | Bian | |
| 2019/0063734 | A1 | 2/2019 | Grider et al. | |
| 2019/0313890 | A1 | 10/2019 | Fiebel et al. | |
| 2020/0072424 | A1 | 3/2020 | Law et al. | |
| 2020/0281297 | A1 | 9/2020 | Kaye et al. | |

FOREIGN PATENT DOCUMENTS

| | | | |
|---|---|---|---|
| CN | 212510578 | U | 2/2021 |
| KR | 1020050109118 | A | 11/2005 |

OTHER PUBLICATIONS

International Search Report and Written Opinion for Application No. PCT/US2021/062014 dated Apr. 4, 2022 (9 pages).

Extended European Search Report for Application No. 21901608.6 dated Dec. 9, 2024 (13 pages).

* cited by examiner

HEADLAMP WITH DETACHABLE LIGHT ASSEMBLY

CROSS-REFERENCE TO RELATED APPLICATION

This application is a divisional of U.S. patent application Ser. No. 17/543,242, filed Dec. 6, 2021, now U.S. Pat. No. 11,815,249, which claims priority to U.S. Provisional Patent Application No. 63/121,480, filed Dec. 4, 2020, the entire contents of each of which are incorporated by reference herein.

FIELD OF THE INVENTION

The present invention relates to portable lights and, more particularly, to headlamps.

BACKGROUND

Some headlamps are intended to be worn over protective equipment, such as helmets or hard hats. Such protective equipment may be made of hard, smooth plastic, resulting in a tendency for a headlamp to slip out of its desired position. To remain in place, headlamps may include one or more retainers (e.g., clips) that interface with a lip or other mating feature(s) on the protective equipment. Although the use of such retainers may advantageously retain the headlamp in its desired position, the retainers may also make it difficult to remove the headlamp from the protective equipment to adjust settings on the headlamp, to charge or replace the battery of the headlamp, to clean the headlamp, etc.

SUMMARY

In one aspect, the disclosure provides a headlamp including a strap, a bracket coupled to the strap, and a light assembly including a housing enclosing a light source and a battery for providing power to the light source. A magnetic interface configured to removably couple the light assembly to the bracket. The magnetic interface includes a first magnetic element fixed to the bracket, and a second magnetic element fixed to the light assembly. The first magnetic element and the second magnetic element are configured to produce a magnetic attractive force to retain the light assembly relative to the bracket.

In some embodiments, the first magnetic element is one of a plurality of first magnetic elements, and the second magnetic element is one of a plurality of second magnetic elements.

In some embodiments, the housing of the light assembly includes a rear housing portion having an upper wall, a center wall, and a lower wall, the upper wall and the lower wall extending from the center wall at oblique angles.

In some embodiments, the plurality of second magnetic elements includes an upper magnetic element fixed to the upper wall, a center magnetic element fixed to the center wall, and a lower magnetic element fixed to the lower wall.

In some embodiments, the bracket includes a cooperating shape to the housing of the light assembly, wherein the plurality of first magnetic elements includes an upper magnetic element, a center magnetic element, and a lower magnetic element. When the light assembly is coupled to the bracket, each of the plurality of first magnetic elements is positioned adjacent the corresponding one of the plurality of second magnetic elements.

In some embodiments, the light assembly is removed from the bracket by grasping the housing and applying sufficient force to overcome the magnetic attractive force.

In some embodiments, the bracket includes a base and a cradle pivotally coupled to the base, the light assembly being removably received in the cradle.

In one aspect, the disclosure provides a headlamp including a bracket configured to be supported on a user's head, the bracket including a base and a cradle pivotally coupled to the base; and a light assembly including a housing enclosing a light source. A magnetic attachment interface is configured to removably couple the light assembly within the cradle. The magnetic attachment interface includes a first magnetic element fixed to the cradle, and a second magnetic element fixed to the housing. The first magnetic element and the second magnetic element are configured to produce a magnetic attractive force to retain the light assembly within the cradle.

In some embodiments, the first magnetic element is one of a plurality of first magnetic elements, and the second magnetic element is one of a plurality of second magnetic elements.

In some embodiments, the cradle includes an upper retaining wall, a center retaining wall, and a lower retaining wall, and wherein the upper retaining wall and the lower retaining wall extend from the center retaining wall at oblique angles.

In some embodiments, the plurality of first magnetic elements includes an upper magnetic element fixed to the upper retaining wall, a center magnetic element fixed to the center retaining wall, and a lower magnetic element fixed to the lower retaining wall.

In some embodiments, the housing includes a rear housing portion having an upper wall, a center wall, and a lower wall, and wherein the upper wall and the lower wall extend from the center wall at oblique angles.

In some embodiments, the plurality of second magnetic elements includes an upper magnetic element fixed to the upper wall, a center magnetic element fixed to the center wall, and a lower magnetic element fixed to the lower wall.

In another aspect, the disclosure provides a headlamp includes a strap and a bracket coupled to the strap. The bracket includes a base having a bottom end including a plurality of teeth, and a cradle coupled to the base for rotation relative to the base about a pivot axis. The cradle includes a spring and a detent configured to engage at least one of the plurality of teeth to retain the cradle in a desired orientation. The spring biases the detent into engagement with the at least one of the plurality of teeth. A lighting assembly coupled to the cradle and including a housing enclosing a light source for emitting light in a first direction and a battery for providing power to the light source.

In some embodiments, the plurality of teeth at least partially surrounds the pivot axis.

In some embodiments, the detent engages the at least one of the plurality of teeth along an axis substantially parallel to the first direction.

In some embodiments, the lighting assembly is removably coupled to the cradle.

In some embodiments, the headlamp also includes a magnetic attachment interface configured to removably couple the lighting assembly within the cradle. The magnetic attachment interface includes a first magnetic element fixed to the cradle, and a second magnetic element fixed to the housing.

In some embodiments, the cradle includes an upper retaining wall, a center retaining wall, and a lower retaining wall. The upper retaining wall and the lower retaining wall extend from the center retaining wall at oblique angles.

In some embodiments, the housing includes a rear housing portion having an upper wall, a center wall, and a lower wall, and wherein the upper wall and the lower wall extend from the center wall at oblique angles.

Other features and aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
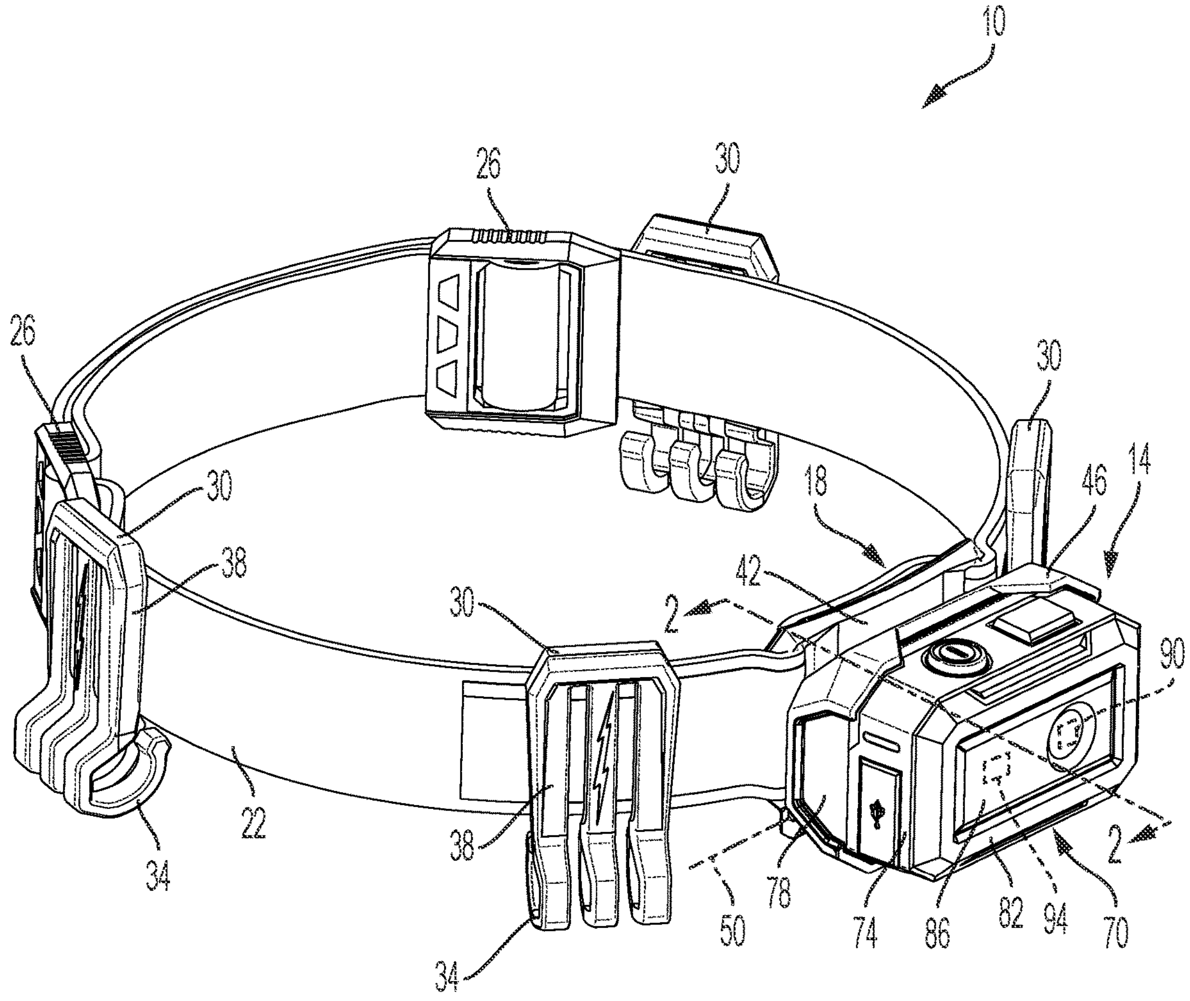
FIG. 1 is a perspective view of headlamp according to one embodiment.

FIG. 1 illustrates a headlamp 10 according to one embodiment. The illustrated headlamp 10 may be secured to a user's head, or to protective equipment, such as a hard hat, allowing for hands-free illumination. The headlamp 10 includes a front light assembly 14, a bracket 18, and a strap 22 coupled to the bracket 18 (e.g., by extending through slots in the bracket 18). Although the illustrated light assembly 14 is a front light assembly, the light assembly 14 may alternatively be a rear light assembly. In some embodiments, the headlamp may include both a front light assembly and a rear light assembly.

The strap 22 is made of a flexible material and, together with the bracket 18, forms a loop configured to extend 360 degrees around the user's head or protective equipment. In the illustrated embodiment, the headlamp 10 includes adjusters 26 positioned along the strap 22. The strap 22 is doubled over between the adjusters 26, and the adjusters 26 are slidable along the strap 22 to increase or decrease a spacing between the adjusters 26, thereby decreasing or increasing a diameter of the loop. The strap 22 is therefore adjustable to accommodate different users and different sizes of protective equipment. In some embodiments, the strap 22 may additionally or alternatively include one or more segments of elastomeric or other stretchable material to allow the diameter of the loop to be varied.

With continued reference to FIG. 1, the illustrated headlamp 10 includes a plurality of retainers 30 (e.g., four retainers 30) coupled to the strap 22 and spaced relative to one another about the circumference of the strap 22. Each of the retainers 30 includes one or more hooks 34 (e.g., three hooks 34) configured to receive and engage a bottom edge of a hard hat (not shown). The retainers 30 may therefore inhibit the strap 22 from slipping upward toward the top of the hard hat. In the illustrated embodiment, each of the hooks 34 is positioned at the distal end of a cantilevered arm 38. The arms 38 are flexible, allowing the positions of the hooks 34 to be adjusted slightly to better conform to the bottom edge of the hard hat. In some embodiments, the retainers 30 may be removable from the strap 22, or the retainers 30 may be omitted, to configure the headlamp 10 to be worn directly on the user's head.

Figure 2:
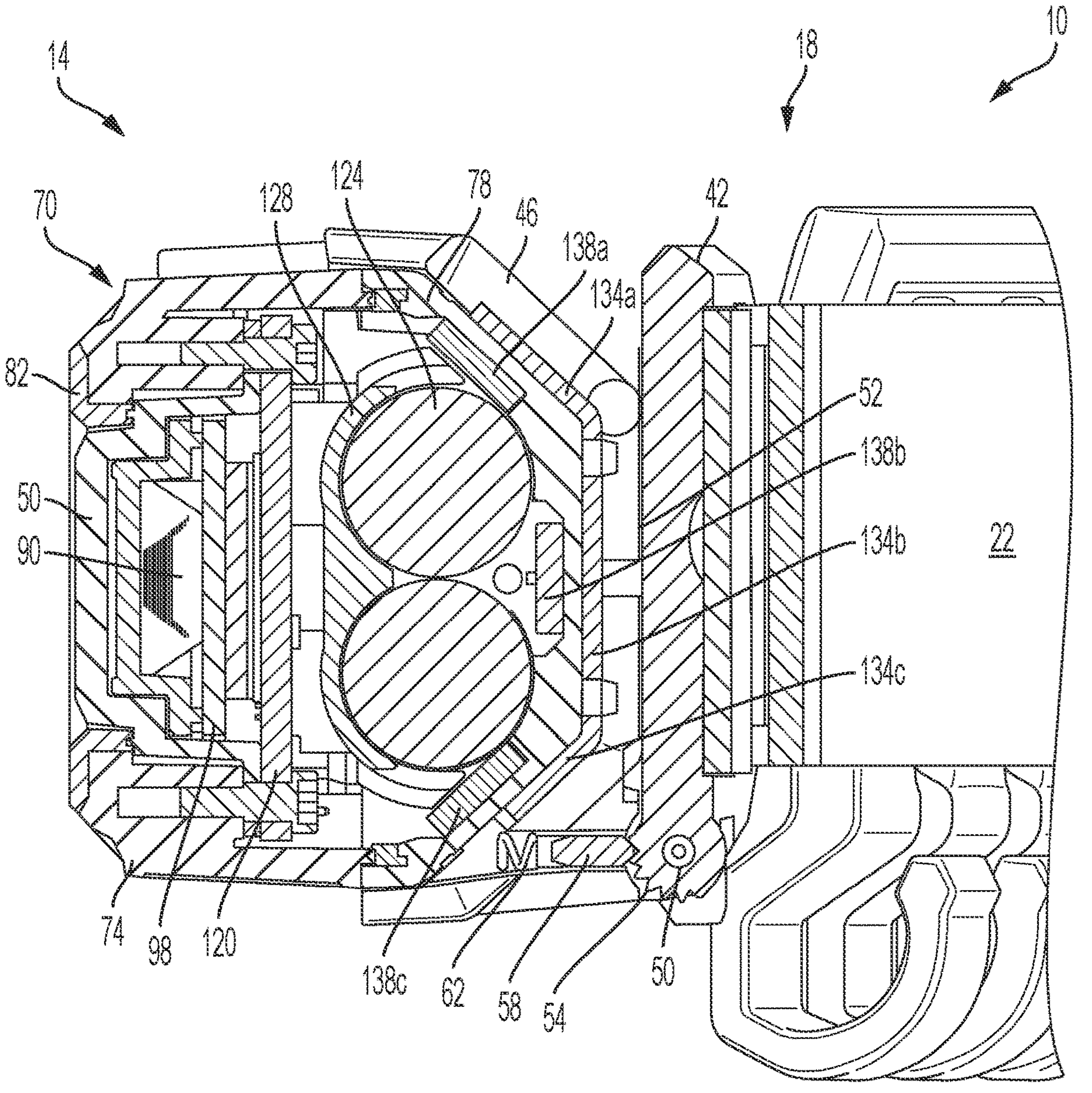
FIG. 2 is a cross-sectional view of the headlamp of FIG. 1, taken along line 2-2 in FIG. 1.
Figure 3:
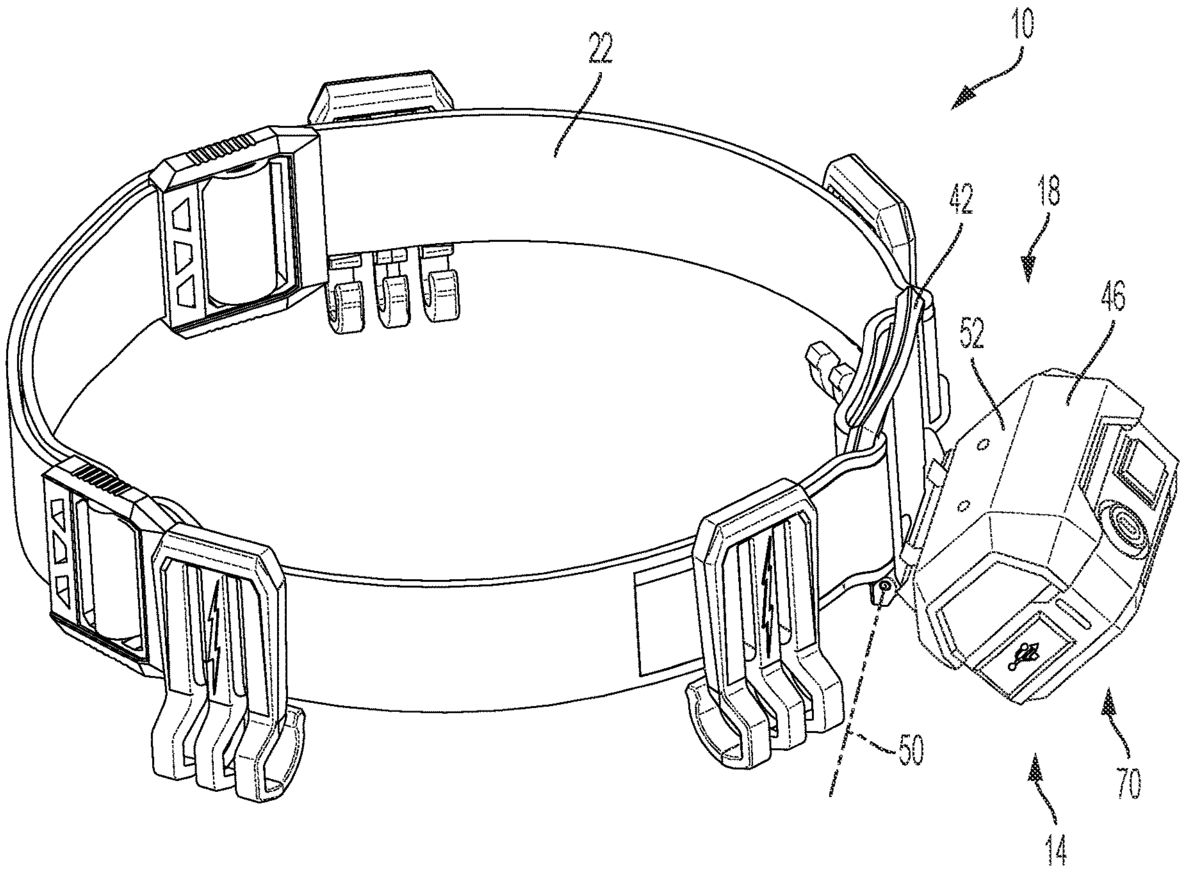
FIG. 3 is a perspective view of the headlamp of FIG. 1, with a support bracket of the headlamp illustrated in a tilted position.

With reference to FIGS. 1-3, the bracket 18 includes a base 42 coupled to the strap 22 and a cradle 46 pivotally coupled to the base 42 such that the cradle 46 is pivotable relative to the base 42 about a pivot axis 50. For example, the cradle 46 may be pivoted relative to the base 42 about the pivot axis 50 between a first position (FIGS. 1 and 2), in which a rear surface 52 of the cradle 46 abuts the base 42, and a second position or tilted position (FIG. 3), in which the rear surface 52 of the cradle 46 is spaced from and angled relative to the base 42. The cradle 46 receives and retains the front light assembly 14 such that pivoting the cradle 46 relative to the base 42 allows a user to adjust the orientation—and therefore the illumination angle—of the front light assembly 14.

In the illustrated embodiment, the cradle 46 is pivotally coupled to the base 42 at a bottom end of the base 42, and the bottom end of the base 42 includes serrations or teeth 54 at least partially surrounding the pivot axis 50 (FIG. 2). The cradle 46 accommodates a detent 58 that is biased into engagement with the teeth 54 by a biasing element 62, such that the biasing element 62 is compressible to permit "ratcheting" of the detent 58 against the teeth 54. The engagement between the detent 58 and the teeth 54 provides resistance that inhibits inadvertent pivoting of the cradle 46 relative to the base 42 and may further provide tactile and/or audible feedback when the cradle 46 is pivoted relative to the base 42 with sufficient force to overcome the resistance of the teeth 54 and detent 58.

Figure 5:
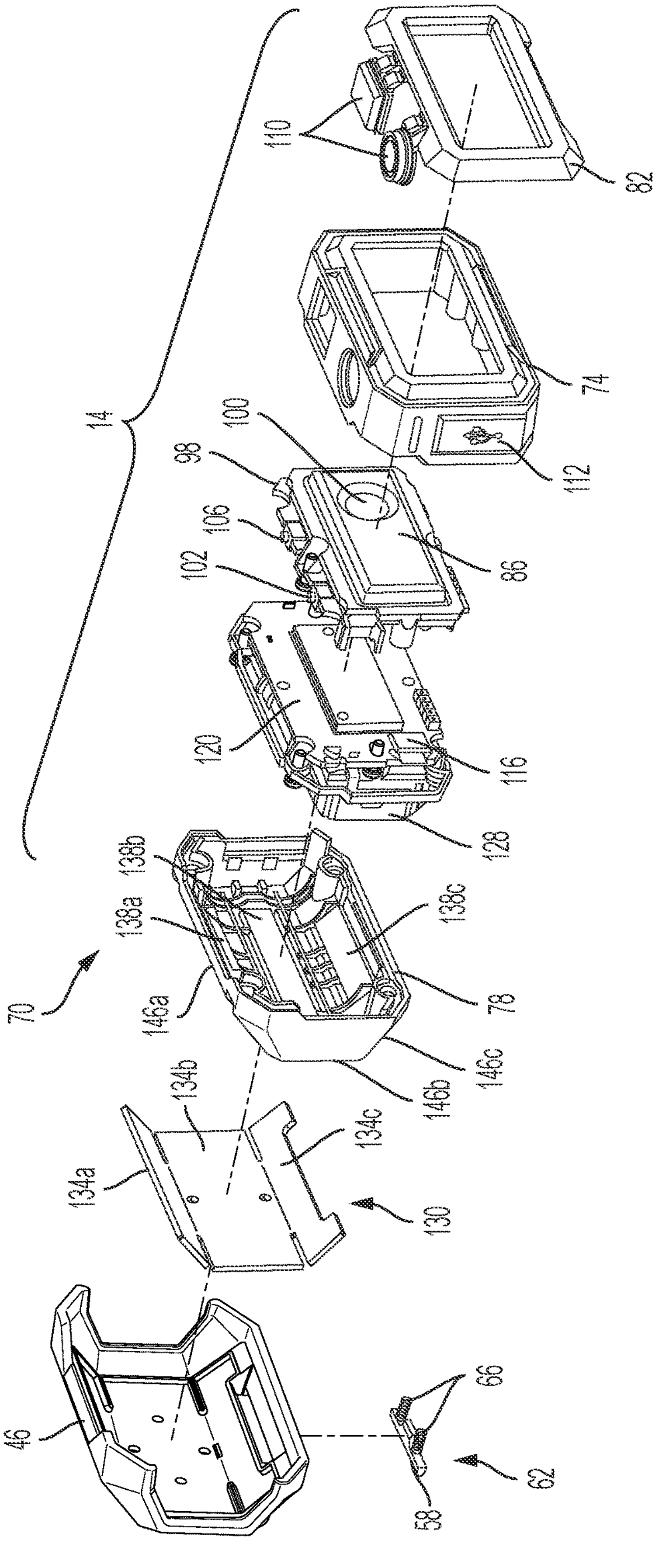
FIG. 5 is an exploded front perspective view of the light assembly and the support bracket of FIG. 4.
Figure 6:
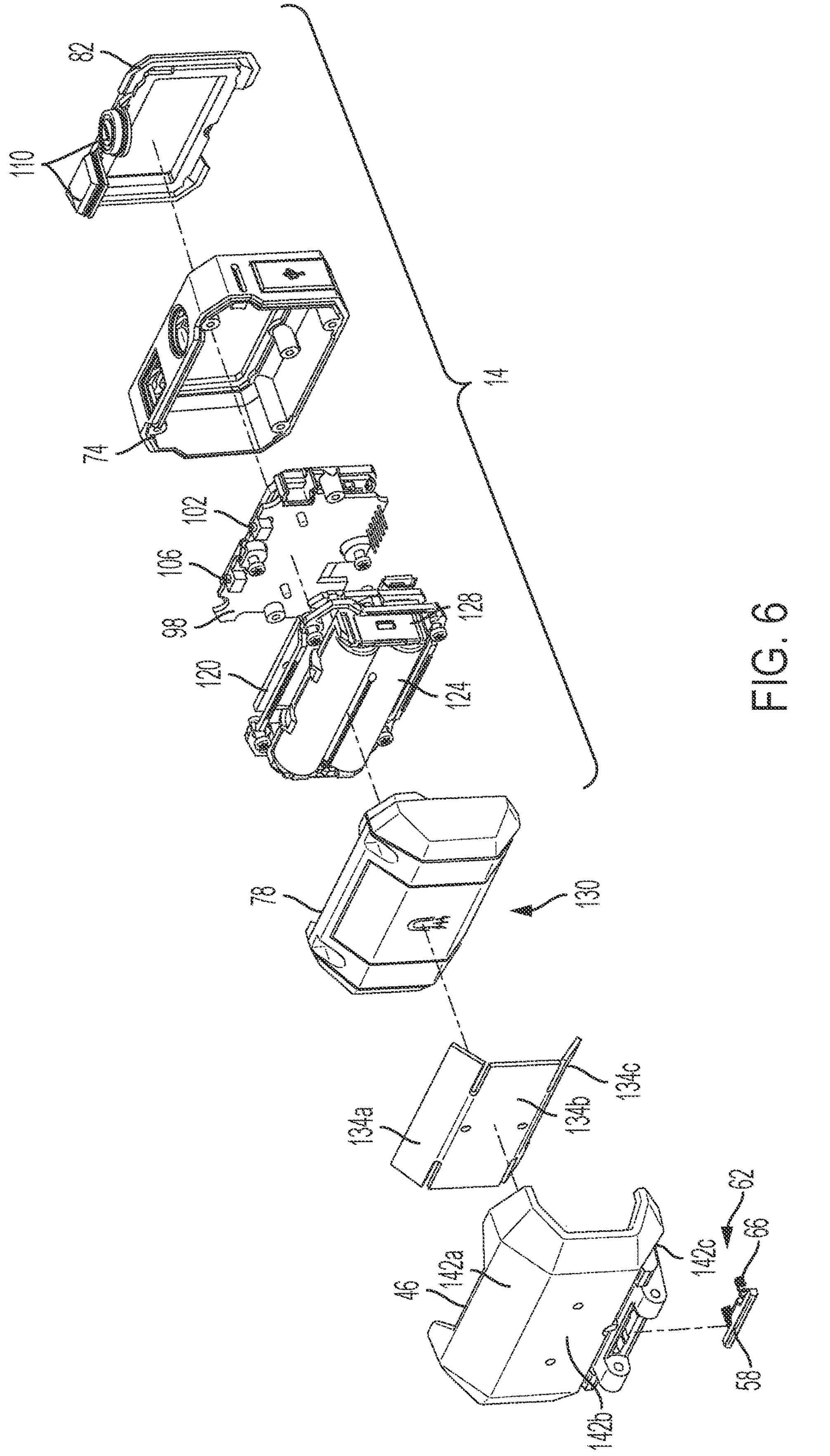
FIG. 6 is an exploded rear perspective view of the light assembly and the support bracket of FIG. 4.

With reference to FIGS. 5-6, the illustrated detent 58 is elongated in a width direction of the cradle 46, and the biasing element 62 includes two coil springs 66. The coil springs 66 are positioned adjacent opposite ends of the detent 58 to promote even engagement of the detent 58 and the teeth 54 across the width of the detent 58. In other embodiments, the biasing element 62, detent 58, and/or the teeth 54 may be configured in other ways suitable for retaining the cradle 46 in a desired orientation relative to the base 42. For example, the detent 58 may be provided on the base 42, and the teeth 54 may be provided on the cradle 46. In yet other embodiments, the teeth 54, detent 58, and biasing element 62 may be omitted, and the pivot connection between the cradle 46 and the base 42 itself may provide sufficient resistance to inhibit inadvertent pivoting of the cradle 46.

With reference to FIG. 1, the front light assembly 14 includes a housing 70, which, in the illustrated embodiment, includes a front housing portion 74 and a rear housing portion 78. The front housing portion 74 includes an elastomeric cover 82 that surrounds a lens 86. The lens 86 is positioned in front of a light source, which in the illustrated embodiment includes a first light source 90 and a second light source 94 at least partially enclosed within housing 70. In addition to protecting the light sources 90, 94, the lens 86 may also diffuse light emitted by the first and second light sources 90, 94 to the surrounding area. In other embodiments, the lens 86 may focus or collimate light from one or both of the light sources 90, 94. In yet other embodiments, the lens 86 may not substantially alter the light emitted by the light sources 90, 94.

With continued reference to FIG. 1, in the illustrated embodiment, the first and second light sources 90, 94 each include one or more light emitting diodes (LEDs). In particular, the first light source 90 includes a first LED, and the second light source 94 includes a second LED. The first LED may be a spot LED, and the second LED may be an area LED. The LEDs are preferably white LEDs and are each mounted to a common printed circuit board (PCB) 98 (FIG. 5). In other embodiments, the first and second light sources 90, 94 may include any number or arrangement of LEDs, which may be mounted to one or more PCBs.

Referring to FIG. 5, a spotlight reflector 100 may be positioned in front of the first light source 90 to direct light emitted by the first light source 90 in a specific direction to form a relatively concentrated beam of light (i.e., a relatively narrow beam angle). The second light source 94 may emit less concentrated light over a wider area (i.e., a relatively wider beam angle). Thus, in some embodiments, the front light assembly 14 is usable as a spotlight when the first light source 90 is illuminated, and as a floodlight when the second light source 94 is illuminated. In other embodiments, other suitable light sources may also or alternatively be employed.

With continued reference to FIG. 5, the PCB 98 provides operational control for the front light assembly 14 (e.g., to turn the light sources 90, 94 ON and OFF using a power actuator 102, and to change an operating mode of the light sources 90, 94 using a mode actuator 106). The power and mode actuators 102, 106 are pushbuttons in the illustrated embodiment, but alternatively can include and combination of buttons, touch sensors, motion sensors, ambient light sensors, switches, or the like to control operation of the front light assembly 14. The actuators 102, 106 are covered by elastomeric button covers 110, which are integrally formed with the cover 82. The button covers 110 may form a water-resistant seal with the front housing portion 74 to inhibit the ingress of water (e.g., rain, etc.) into the front housing portion 74.

The mode actuator 106 may toggle the front light assembly 14 between a plurality of different modes. For example, in some embodiments, the front light assembly 14 may be operable in five different modes: a first mode in which both the first and second light sources 94 emit light (e.g., a maximum brightness mode), a second mode in which the first light source 90 does not emit light and the second light source 94 emits light at a high intensity (e.g., a high flood mode), a third mode in which the first light source 90 does not emit light and the second light source 94 emits light at a medium intensity (e.g., a medium flood mode), a fourth mode in which the first light source 90 does not emit light and the second light source 94 emits light at a low intensity (e.g., a low flood mode), and a fifth mode in which the first light source 90 emits light at a high intensity and the second light source 94 does not emit light (e.g., a spot mode). In alternative embodiments, the front light assembly 14 may be operable in other modes, such as flashing or strobe modes, and/or in any combination or subset of the five modes. The user may cycle through modes (e.g., first, second, third, fourth, fifth modes) by repeatedly pressing the mode actuator 106. In other embodiments, the user may cycle through modes by pressing the mode actuator 106 in a predetermined pattern, holding down the mode actuator 106, or the like. In other embodiments, the mode actuator 106 may be omitted, and the user may cycle through modes by depressing the power actuator 102 in predetermined patterns (e.g., multiple short presses, etc.).

The headlamp 10 may include an internal control unit, including, for example a microprocessor and memory disposed on the PCB 98, capable of storing information and executing functions. The internal control unit is configured to store the operating mode of the front light assembly 14 (as set by the mode actuator 106) when the front light assembly 14 is powered ON and OFF by the power actuator 102. This results in a light that may be turned ON and OFF while maintaining the most recent state of the front light assembly 14 (e.g., the mode of the front light assembly 14), thereby allowing the user to turn the front light assembly 14 ON with the last setting without having to readjust the light 14.

With continued reference to FIG. 5, the illustrated front housing portion 74 includes an access opening 112 that provides access to a charging port 116 located on a second PCB 120. The illustrated charging port 116 is configured as a USB port, although other suitable charging ports may also or alternatively be included on the front light assembly 14. The charging port 116 is electrically connected to a rechargeable battery 124 (FIG. 6). The battery 124 may include one or more cells of any suitable chemistry (e.g., a Lithium-Ion chemistry), and the battery 124 is supported by a battery receptacle 128 positioned behind the second PCB 120. The battery receptacle 128 includes battery terminals (not shown) electrically coupled to the second PCB 120 and the first PCB 98 to provide power from the battery 124 to the light sources 90, 94.

Figure 4:
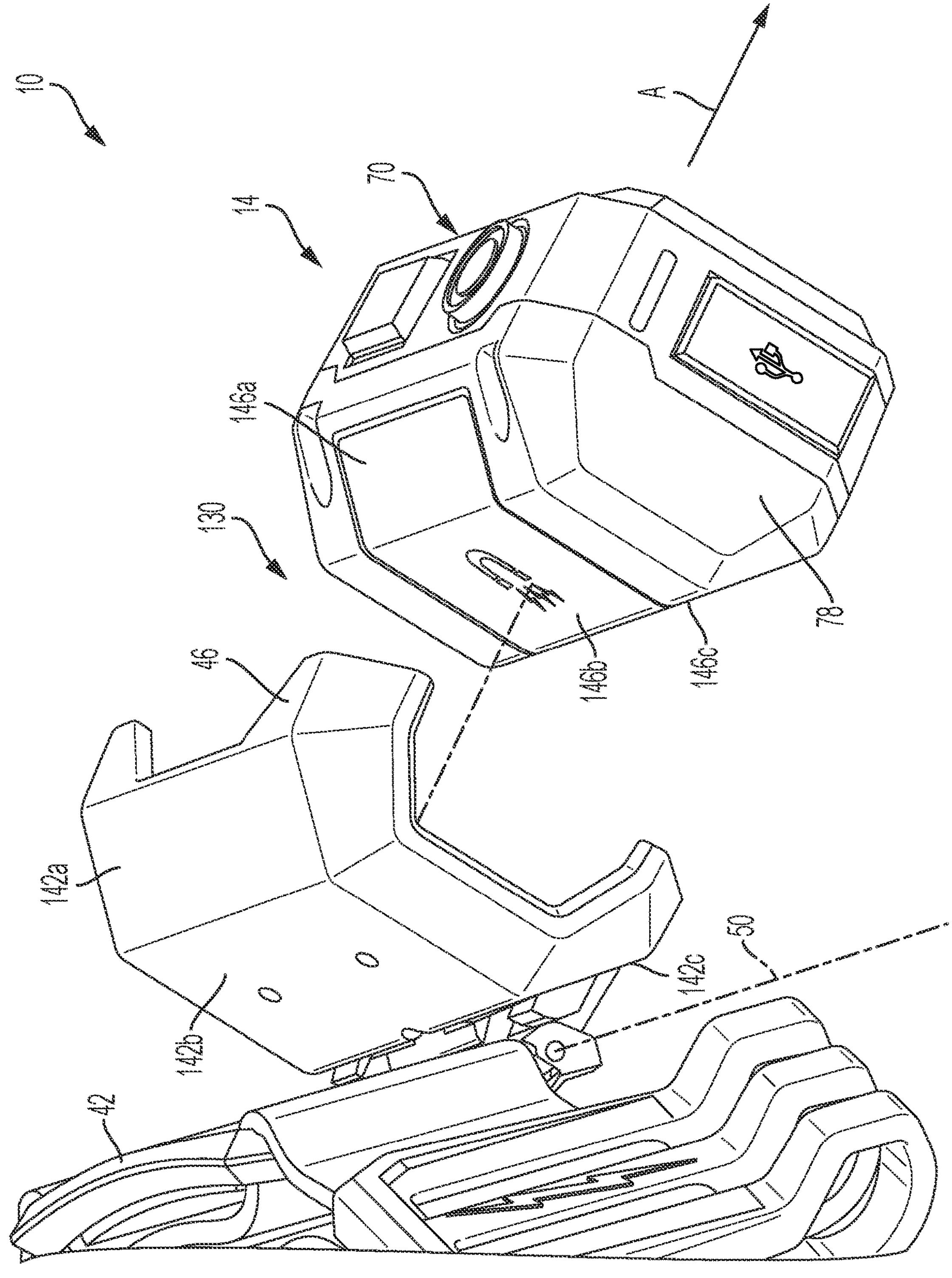
FIG. 4 is a perspective view illustrating a light assembly of the headlamp of FIG. 1 detached from the support bracket.

With reference to FIG. 4, the headlamp 10 includes a magnetic attachment interface 130 that magnetically couples the front light assembly 14 to the cradle 46. More specifically, the magnetic attachment interface 130 permits the front light assembly 14 to be quickly attached to and detached from the cradle 46, without the use of tools, and without any latches, fasteners, or other mechanical mechanisms.

In the illustrated embodiment, the magnetic attachment interface 130 includes one or more first magnetic elements 134*a-c* fixed to the cradle 46 and one or more second magnetic elements 138*a-c* fixed to the rear portion 78 of the housing 70 (FIG. 2). In the illustrated embodiment, the magnetic attachment interface 130 includes three first magnetic elements 134*a-c* and three second magnetic elements 138*a-c*. In other embodiments, the magnetic attachment interface 130 may include fewer or more first magnetic elements 134*a-c* and/or second magnetic elements 138*a-c*. In some embodiments, one of the first magnetic elements 134*a-c* or the second magnetic elements 138*a-c* may include permanent magnetic material, such as one or more rare earth magnets, and the other of the first magnetic elements 134*a-c* or the second magnetic elements 138*a-c* may include ferromagnetic material, such as mild steel. In other embodiments, both the first magnetic elements 134*a-c* and the second magnetic element 138*a-c* may include permanent magnetic material.

The cradle 46, the rear portion 78 of the housing 70, and the magnetic attachment interface 130 are shaped to provide a secure attachment that permits pivoting movement of the cradle 46 and the front light assembly 14 relative to the base 42 of the bracket 18 without decoupling the front light assembly 14 from the cradle 46.

More specifically, the cradle 46 includes an upper retaining wall 142*a*, a center retaining wall 142*b*, and a lower retaining wall 142*c* (FIG. 4). The upper retaining wall 142*a* and the lower retaining wall 142*c* extend from the center retaining wall 142*b* at oblique angles, such that the retaining walls 142*a-c* generally form a trapezoidal shape. The illustrated plurality of first magnetic elements 134*a-c* includes an upper magnetic element 134*a* fixed to the upper retaining wall 142*a*, a center magnetic element 134*b* fixed to the center retaining wall 142*b*, and a lower magnetic element 134*c* fixed to the lower retaining wall 142*c* (FIG. 6). As such, the first magnetic elements 134*a-c* are arranged parallel to the respective retaining walls 142*a-c* of the cradle 46. In some embodiments, the magnetic attachment interface 130 may only include one of the first magnetic elements 134*a-c* or a subset of the first magnetic elements 134*a-c* fixed to the cradle 46.

Similarly, the rear portion 78 of the housing 70 includes an upper wall 146*a*, a center wall 146*b*, and a lower wall 146*c* (FIG. 4). The upper wall 146*a* and the lower wall 146*c* extend from the center wall 146*b* at oblique angles equal to those of the cradle 46, such that the walls 146*a-c* generally form a trapezoidal shape corresponding with the shape of the cradle 46. The illustrated plurality of second magnetic elements 138*a-c* includes an upper magnetic element 138*a* fixed to the upper wall 146*a*, a center magnetic element 138*b* fixed to the center wall 146*b*, and a lower magnetic element 138*c* fixed to the lower wall 146*c* (FIG. As such, the second magnetic elements 138*a-c* are arranged parallel to the respective walls 146*a-c* of the rear portion 78 of the housing 70. In some embodiments, the magnetic attachment interface 130 may only include one of the second magnetic elements 138*a-c* or a subset of the second magnetic elements 138*a-c* fixed to the housing 70.

Thus, when the front light assembly 14 is received in the cradle 46, the first magnetic elements 134*a-c* align with the second magnetic elements 138*a-c* to produce a magnetic attractive force between the respective magnetic elements 134*a-c*, 138*a-c* of sufficient strength to retain the front light assembly 14 within the cradle 46 (FIG. 2).

During operation of the headlamp 10, the front light assembly 14 may be operated as a spotlight and as a flood light by changing between different operating modes via the mode actuator 106. Power is provided from the battery 124 contained within the housing 70 to the first and second light sources 90, 94. The user may adjust the illumination angle of the front light assembly 14 by grasping the housing 70 of the front light assembly 14 and/or the cradle 46 and applying sufficient force to overcome the resistance provided by engagement between the detent 58 and the teeth 54. This causes the bracket 46 and the front light assembly 14 to pivot relative to the base 42 about the pivot axis 50 (e.g., between the initial position of FIG. 1 and the tilted position of FIG. 3).

The magnetic attachment interface 130, together with the cooperating shapes of the rear portion 78 of the housing 70 and the cradle 46, keep the front light assembly 14 securely seated within the cradle 46 during pivotal adjustment of the front light assembly. If the user wishes to remove the front light assembly 14 from the cradle 46, however, the user need only pull on the housing 70 of the front light assembly 14 in the direction of arrow A in FIG. 4, with sufficient force to overcome the magnetic attraction force of the magnetic elements 134*a-c*, 138*a-c*. The front light assembly 14 may thus be quickly and easily removed (e.g., to charge the battery 124, change the operating mode, clean the lens 86, etc.). To reattach the front light assembly 14 to the cradle 46, the user inserts the front light assembly 14 into the cradle 46. As the walls 146*a-c* of the rear housing portion 78 approach the corresponding walls 142*a-c* of the cradle 46, the magnetic elements 134*a-c*, 138*a-c* develop a magnetic attractive force that again retains the front light assembly 14 within the cradle 46.

Although the invention has been described in detail with reference to certain preferred embodiments, variations and modifications exist within the scope and spirit of one or more independent aspects of the invention as described.

What is claimed is:

1. A headlamp comprising:

a strap;

a bracket coupled to the strap, the bracket including:

a base having a bottom end including a plurality of teeth, and a cradle coupled to the base for rotation relative to the base about a pivot axis, the cradle including a spring and a detent configured to engage at least one of the plurality of teeth to retain the cradle in a desired orientation, the spring biasing the detent into engagement with the at least one of the plurality of teeth; and a lighting assembly coupled to the cradle and including a housing enclosing a light source for emitting light in a first direction and a battery for providing power to the light source, the lighting assembly also including a first magnetic element fixed to a first wall of the housing and a second magnetic element fixed to a second wall of the housing that is at an oblique angle relative to the first wall, wherein the first magnetic element and the second magnetic element retain the lighting assembly within the cradle.

2. The headlamp of claim 1, wherein the plurality of teeth at least partially surrounds the pivot axis.

3. The headlamp of claim 1, wherein the detent engages the at least one of the plurality of teeth along an axis substantially parallel to the first direction.

4. The headlamp of claim 1, wherein the lighting assembly is removably coupled to the cradle.

5. The headlamp of claim 4, wherein the cradle includes a first magnetic element and a second magnetic element that interact with the first magnetic element and the second magnetic element of the lighting assembly.

6. The headlamp of claim 5, wherein the cradle includes an upper retaining wall, a center retaining wall, and a lower retaining wall, wherein the upper retaining wall and the lower retaining wall extend from the center retaining wall at oblique angles.

7. The headlamp of claim 6, wherein the detent is positioned below the lower retaining wall.

8. The headlamp of claim 6, wherein the first magnetic element of the cradle is fixed to one of the upper retaining wall, the center retaining wall, and the lower retaining wall, and wherein the second magnetic element of the cradle is fixed to another of the upper retaining wall, the center retaining wall, and the lower retaining wall.

9. The headlamp of claim 1, wherein upon application of a pivoting force on the cradle, the detent overcomes the force of the spring to disengage from the at least one of the plurality of teeth and the spring biases the detent into engagement with another of the plurality of teeth to change the desired orientation.

10. The headlamp of claim 9, wherein the engagement of the detent with the at least another of the plurality of teeth creates a tactile feedback.

11. The headlamp of claim 9, wherein the engagement of the detent with the at least another of the plurality of teeth creates an auditory feedback.

12. The headlamp of claim 1, wherein the detent is linearly slidable within the housing to engage the at least one of the plurality of teeth.

13. The headlamp of claim 1, wherein the detent is positioned at a bottom of the cradle.

14. The headlamp of claim 1, wherein the base is configured to couple to the strap and the cradle is pivotable with respect to the strap.

15. A headlamp comprising:

a strap;

a bracket including a base coupled to the strap, the base having a plurality of teeth, and a cradle coupled to the base for rotation relative to the base about a pivot axis, the cradle including a detent configured to engage at least one of the plurality of teeth to retain the cradle in a desired orientation, the cradle also including a first magnetic element fixed to a first wall of the cradle and a second magnetic element fixed to a second wall of the cradle that is at an oblique angle relative to the first wall; and a lighting assembly removably coupled to the cradle and including a housing enclosing a light source and a battery for providing power to the light source;

wherein the detent is linearly slidable to engage the at least one of the plurality of teeth, wherein the first magnetic element and the second magnetic element retain the lighting assembly within the cradle.

16. The headlamp of claim 15, wherein the lighting assembly is removably coupled to the cradle by a magnetic attractive force.

17. The headlamp of claim 16, wherein the light assembly is removable from the bracket by grasping the housing and applying sufficient force to overcome the magnetic attractive force.

18. The headlamp of claim 15, wherein the plurality of teeth are located at a bottom of the base and partially surround the pivot axis.

19. The headlamp of claim 15, wherein the detent is biased into engagement with the teeth by a biasing member.

20. The headlamp of claim 19, wherein the biasing member includes a coil spring.

* * * * *